Jan. 10, 1933.    D. J. CAREY    1,893,578
PROCESS OF SEPARATING MINERALS
Filed April 6, 1932
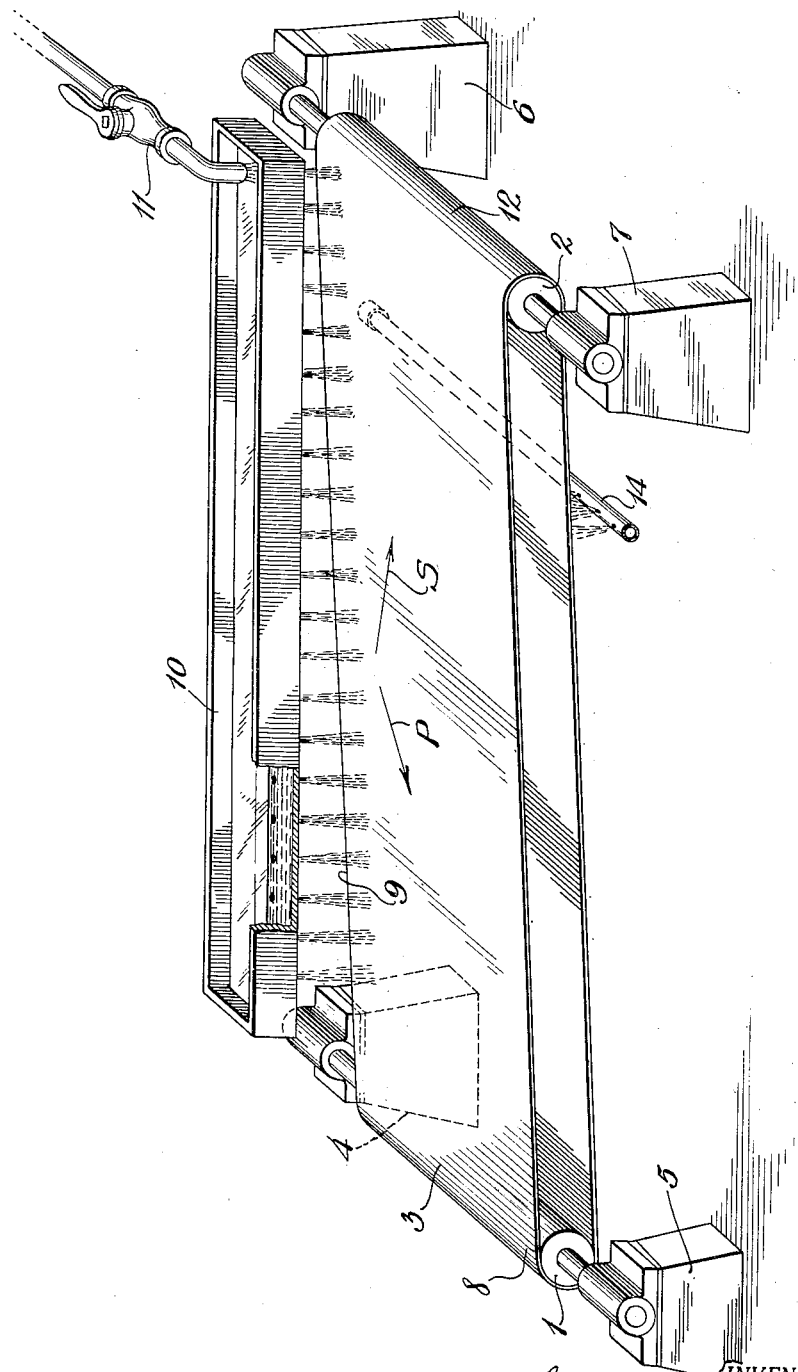
INVENTOR.
Daniel J. Carey.
BY
Kiddle, Margeson and Harnidge.
ATTORNEYS.

Patented Jan. 10, 1933

1,893,578

UNITED STATES PATENT OFFICE

DANIEL J. CAREY, OF EATON PARK, FLORIDA

PROCESS OF SEPARATING MINERALS

Application filed April 6, 1932. Serial No. 603,495.

My invention relates broadly to the separation of minerals and is directed to a process particularly adapted for separating minerals from waste materials. Still more specifically the present invention is directed to the separating of phosphate particles from sands.

Phosphate deposits are usually found five to forty feet underground, and in mining this overburden is first removed and then the phosphate deposit which is a mixture of phosphate and sands, i. e., sand and clay, is removed hydraulically, the mixture of water, phosphate and sands flowing into a sump hole. This mixture is pumped to washers employed to separate the phosphate from the sands. These washers are customarily rotary drums with slots in the wall about half an inch long and one-thirty-second of an inch wide.

The sands found with the phosphate deposit are composed of fairly regularly shaped spherical particles. The phosphate particles on the other hand are irregular in shape, but by reason of the fact that the slots in the washers are elongated, as above mentioned, a great deal of the irregularly shaped phosphate particles passes through these slots with the sands despite the care exercised against such occurrence. Some engineers in fact estimate that twenty-five to thirty percent of the total phosphate in the Florida mines has been thrown out and is still on the waste dumps. This mixture of phosphate particles and sands is a waste material so far as its use as phosphate is concerned and much effort has been directed to the recovery of the phosphate particles. Up to the present, however, no method has been devised which has proven satisfactory.

The present invention provides a process well adapted, for instance, for the recovery of the phosphate particles from sands, the equipment for which is relatively cheap both in first cost and cost of operation.

My process, contrary to prior separation processes, relies on the difference in shape between the particles to be separated rather than on differences in specific gravity, for while the specific gravity of dry phosphate is approximately 3.2 and that of the dry sands approximately 2.6, yet when wet, as is the case in the practice of my process, the difference in specific gravity is but slight.

As above mentioned, I have observed that the waste material (phosphate and sands) which pass through the slots in the washers are very different in shape as well as in size, the phosphate particles being irregular (roughly rectangular), for example, they may be almost an inch long and one-thirty-second thick, while the sand particles are spherical and less than one-thirty-second in diameter. Consequently while the sand particles, if contacted with an inclined surface for instance so as to be brought under gravital influence, may move under such influence more readily than the irregularly shaped particles of phosphate, yet as I have discovered the phosphate particles will move more readily than the sands if a mixture of the phosphate particles and sands be submerged in water and relative motion be produced between the mixture and the water, as by causing the water to flow gently with respect to the mixture or by, for example, drawing the mixture through the water. I make use of this phenomena in the practice of my invention and find that I obtain the desired separation or recovery of the phosphate particles.

I believe the separation I obtain is not due to difference in specific gravity between the sands and the phosphate particles but due to the difference in shape between the spherical sand particles and the irregular phosphate particles, the latter due to their irregular shape offering a more extensive surface to the action of the water. It is to be appreciated also that the phosphate particles due to their shape will present a much more broken surface to the action of the water than the regularly shaped spherical sand particles, in a mixture of sands and phosphate.

It will at once be appreciated that many different types of apparatus may be employed in the practice of my invention and hence the apparatus shown in the accompanying drawing is to be taken as merely illustrative but not in any sense definitive.

Referring to the drawing, 1 and 2 designate two rollers carrying a belt 3 of canvas, for example, or other suitable material, but preferably one having a roughened surface. Either one or both of these rollers will be driven from any suitable source of power. The direction of travel of the belt is from left to right, as viewed in the drawing.

For purposes of illustration I have shown the rollers mounted on bearing blocks, the blocks 4 and 5 mounting the roller 1 while the blocks 6 and 7 mount the roller 2. The blocks 4 and 5 are lower than the blocks 6 and 7 so that the belt 3 slopes downwardly from right to left lengthwise of the belt, while the blocks 5 and 7 are lower than the blocks 4 and 6 so that the belt is tipped transversely. In addition the block 5 is lower than the three other blocks so that the corner designated 8 is really the lowest part of the belt. It will be appreciated of course that the height of the several bearing blocks may be varied as desired.

Along the high side of the belt, that is, the side which I have designated 9 I have shown a water trough 10 with a perforated bottom, means at 11 being provided for supplying water to this trough.

In operation the mixture to be treated, i. e., water, phosphate particles and sands, the volume of water being far in excess of the phosphate and sands, is flowed upon the belt 3 adjacent the side 9 and preferably about midway of the belt, water at the same time flowing out of the trough 10 upon the belt. The discharge upon the belt is fairly gentle. As the water spreads out over the belt I find the sand particles will deposit quite uniformly on the belt surface and be moved away with the belt in the general direction of the arrow S, finally discharging from the belt at the upper end 12, while the phosphate particles due to their irregular shape do not deposit so readily on the belt but are swept along with the water in the general direction of the arrow P, finally discharging off the belt at the lower corner 8 or thereabouts. In other words the irregularly shaped particles of phosphate are more readily moved by the water than the more regularly shaped spherical sand particles, and a differential, so far as particle movement is concerned, is established between the phosphate particles and the sand particles, the net result being the desired separation.

I have found also that the sand particles deposit more uniformly or pack more closely on the belt 3 than the phosphate particles so as to occupy a position where they are not capable of being readily acted on by the water, this condition increasing as the operation goes on so that as a bed or surface of sands builds up on the belt the efficiency of the process increases.

For convenience a pipe such as that shown at 14 may be provided beneath the belt, this pipe which is perforated being supplied with water from any suitable source so as to wash the sands off the underside of the belt.

What I claim is:—

1. The process of effecting separation of the particles of a material from a mixture with the differently shaped particles of another material, said materials when wet being of substantially the same specific gravity, which process comprises contacting the mixture with a body of water and effecting a relative movement between the mixture and the body of water so as to establish a differential, due to the said relative movement and the aforesaid difference in shape of the particles of the two materials, between the movement of the particles of the one material and the movement of the particles of the other material, to effect the desired separation.

2. The process of effecting separation of the irregularly shaped particles of a material from a mixture with the substantially regularly shaped spherical particles of another material, said materials when wet being of substantially the same specific gravity, which process comprises subjecting the mixture to the action of flowing water to effect movement of the irregularly shaped particles, due to their shape, at a different rate from the spherical particles to secure the desired separation.

3. The process of effecting separation of the irregularly shaped particles of a material from a mixture with the rounded particles of another material, said materials when wet being substantially of the same specific gravity, which process comprises depositing the mixture along with a continuous supply of water upon a uniformly traveling surface moving against gravity to effect movement of the rounded particles in the general direction of movement of said surface and movement of the irregularly shaped particles in the general direction of the water flow.

4. In the treatment of mixtures of irregularly shaped phosphate particles and substantially regularly shaped particles of sands, said materials being of substantially the same specific gravity when wet, the method which comprises contacting the mixture with flowing water so as to effect movement of the phosphate particles due to their irregular shape at a faster rate than the sands.

5. In the treatment of mixtures of irregularly shaped phosphate particles and substantially regularly shaped particles of sands, said materials being of substantially the same specific gravity when wet, the method which comprises contacting the mixture with flowing water while contacting the sands with a retarding surface thereby to effect movement of the phosphate particles at a different rate of speed than the movement of the sands.

This specification signed this 1st day of April, 1932.

DANIEL J. CAREY.